(12) United States Patent
Lofley, Sr. et al.

(10) Patent No.: US 8,939,051 B1
(45) Date of Patent: *Jan. 27, 2015

(54) EXTENSION TOOL

(76) Inventors: Robert G. Lofley, Sr., Seffner, FL (US); Robert G. Lofley, Jr., Seffner, FL (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/374,200

(22) Filed: Dec. 15, 2011

Related U.S. Application Data

(60) Provisional application No. 61/459,635, filed on Dec. 16, 2010.

(51) Int. Cl.
*B25G 1/04* (2006.01)
*F16B 7/14* (2006.01)

(52) U.S. Cl.
CPC ............... *B25G 1/04* (2013.01); *F16B 7/1472* (2013.01)
USPC .......... 81/177.2; 294/210; 403/109.4; 81/489

(58) Field of Classification Search
CPC .............. B25G 1/00; B25G 1/04; B25G 1/10; F16B 7/14; F16B 7/1418; F16B 7/1472; F16B 7/105; B25B 13/48; B25B 23/0021; B61H 13/02; B25J 1/00
USPC ......... 81/177.2, 488, 489, 484; 294/210, 175; 403/109.4, 109.1, 109.6
See application file for complete search history.

(56) References Cited

U.S. PATENT DOCUMENTS

| | | | |
|---|---|---|---|
| 684,858 A | 10/1901 | Pearson | |
| 872,271 A | 10/1907 | Benet | |
| 918,579 A | 4/1909 | Murch | |
| 1,365,851 A | 1/1921 | Reynolds | |
| 1,726,372 A | 8/1929 | Stoll | |
| 4,076,213 A | 2/1978 | Payson | |
| 4,576,501 A * | 3/1986 | McConnell | 403/109.4 |
| 4,577,837 A | 3/1986 | Berg et al. | |
| 4,646,378 A | 3/1987 | Borden | |
| 4,715,252 A | 12/1987 | Pella | |
| 4,918,896 A | 4/1990 | Wiese | |
| 4,991,469 A | 2/1991 | Pella | |
| 5,433,551 A | 7/1995 | Gordon | |
| 5,481,950 A * | 1/1996 | Browning | 81/488 |
| 5,625,923 A | 5/1997 | Huang | |
| 5,811,688 A | 9/1998 | Marsh et al. | |

(Continued)

OTHER PUBLICATIONS

U.S. Appl. No. 12/589,856, Robert G. Lofley, Sr., et al.

(Continued)

*Primary Examiner* — Hadi Shakeri
(74) *Attorney, Agent, or Firm* — Frijouf, Rust & Pyle, P.A.

(57) ABSTRACT

An extension tool is disclosed comprising a first pole and a second pole. The second pole is partially disposed in the first pole for defining a variable overall tool length. A slide controller includes a lower clamp and an upper clamp. The first pole is disposed in the lower clamp. A first clamp compressor applies a compressive force to the lower clamp for defining a lower clamp lock and coupes the slide controller with the first pole. A second clamp compressor applies a compressive force to the upper clamp for defining an upper clamp lock and prevents slidable displacement of the second pole relative to the first pole. The second clamp compressor applies a non-compressive force to the upper clamp for defining an upper slide guide. The upper slide guide facilitates the slidable displacement of the second pole relative to the first pole.

15 Claims, 14 Drawing Sheets

(56) References Cited

U.S. PATENT DOCUMENTS

| | | | |
|---|---|---|---|
| 6,182,539 B1 * | 2/2001 | Webster | 81/177.2 |
| 6,213,672 B1 | 4/2001 | Varga | |
| 6,254,305 B1 | 7/2001 | Taylor | |
| 6,347,777 B1 | 2/2002 | Webber | |
| 6,461,074 B2 | 10/2002 | Taylor | |
| 6,682,209 B2 | 1/2004 | Drake et al. | |
| 6,682,432 B1 * | 1/2004 | Shinozuka | 464/78 |
| 6,951,185 B1 | 10/2005 | Wiese | |
| 7,025,015 B2 | 4/2006 | Wilcox et al. | |
| 7,040,832 B2 | 5/2006 | Hsieh | |
| 7,097,380 B2 | 8/2006 | Lee | |
| 7,111,574 B2 | 9/2006 | Slatter | |
| 7,293,934 B1 | 11/2007 | Huang | |
| 7,311,061 B1 | 12/2007 | Wiese | |
| D663,193 S | 7/2012 | Lofley, Sr. et al. | |
| D676,735 S | 2/2013 | Lofley, Sr. et al. | |
| 8,434,802 B2 | 5/2013 | Lofley, Sr. et al. | |
| 8,469,425 B1 | 6/2013 | Lofley, Sr. et al. | |
| 8,469,426 B2 | 6/2013 | Lofley, Sr. et al. | |
| 2004/0016385 A1 | 1/2004 | Wilcox et al. | |
| 2004/0088824 A1 * | 5/2004 | Hsien | 16/111.1 |
| 2006/0062632 A1 | 3/2006 | Jang | |

OTHER PUBLICATIONS

U.S. Appl. No. 12/927,952, Robert G. Lofley, Sr., et al.
U.S. Appl. No. 13/374,200, Robert G. Lofley, Sr., et al.
U.S. Appl. No. 29/439,382, Robert G. Lofley, Sr., et al.
U.S. Appl. No. 13/616,293, Robert G. Lofley, Sr., et al.
U.S. Appl. No. 29/414,965, Robert G. Lofley, Sr., et al.
www.alltackle.com/rupp_big_riggs_ruppriggers.htm.
www.paint-and-supplies.hardwarestore.com/47-345-extension-poles/z-pro-telescoping-extension-pole-453423.aspx.
U.S. Appl. No. 61/459,635, Robert G. Lofley, Sr., et al.
U.S. Appl. No. 61/271,116, Robert G. Lofley, Sr., et al.
U.S. Appl. No. 61/197,908, Robert G. Lofley, Sr., et al.
U.S. Appl. No. 61/633,026, Robert G. Lofley, Sr., et al.
U.S. Appl. No. 12/567,135, Robert G. Lofley, Sr., et al.
U.S. Appl. No. 13/926,127, Robert G. Lofley, Sr., et al.

* cited by examiner

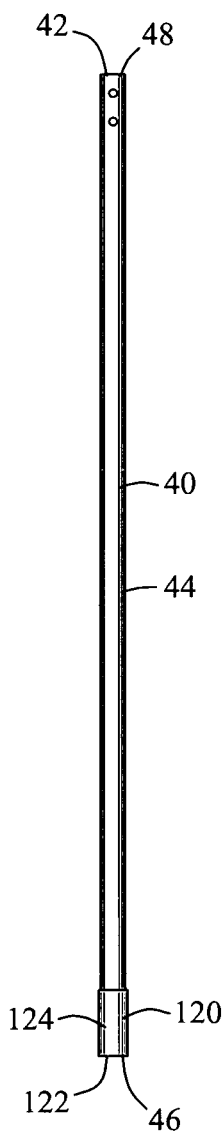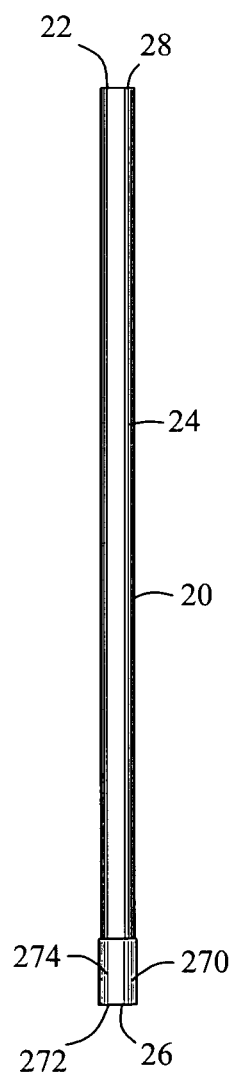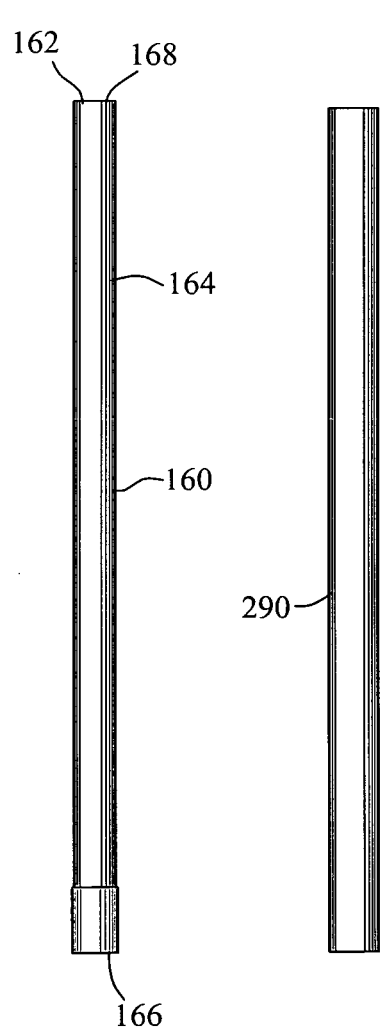
FIG. 6　　FIG. 7　　FIG. 8　　FIG. 9

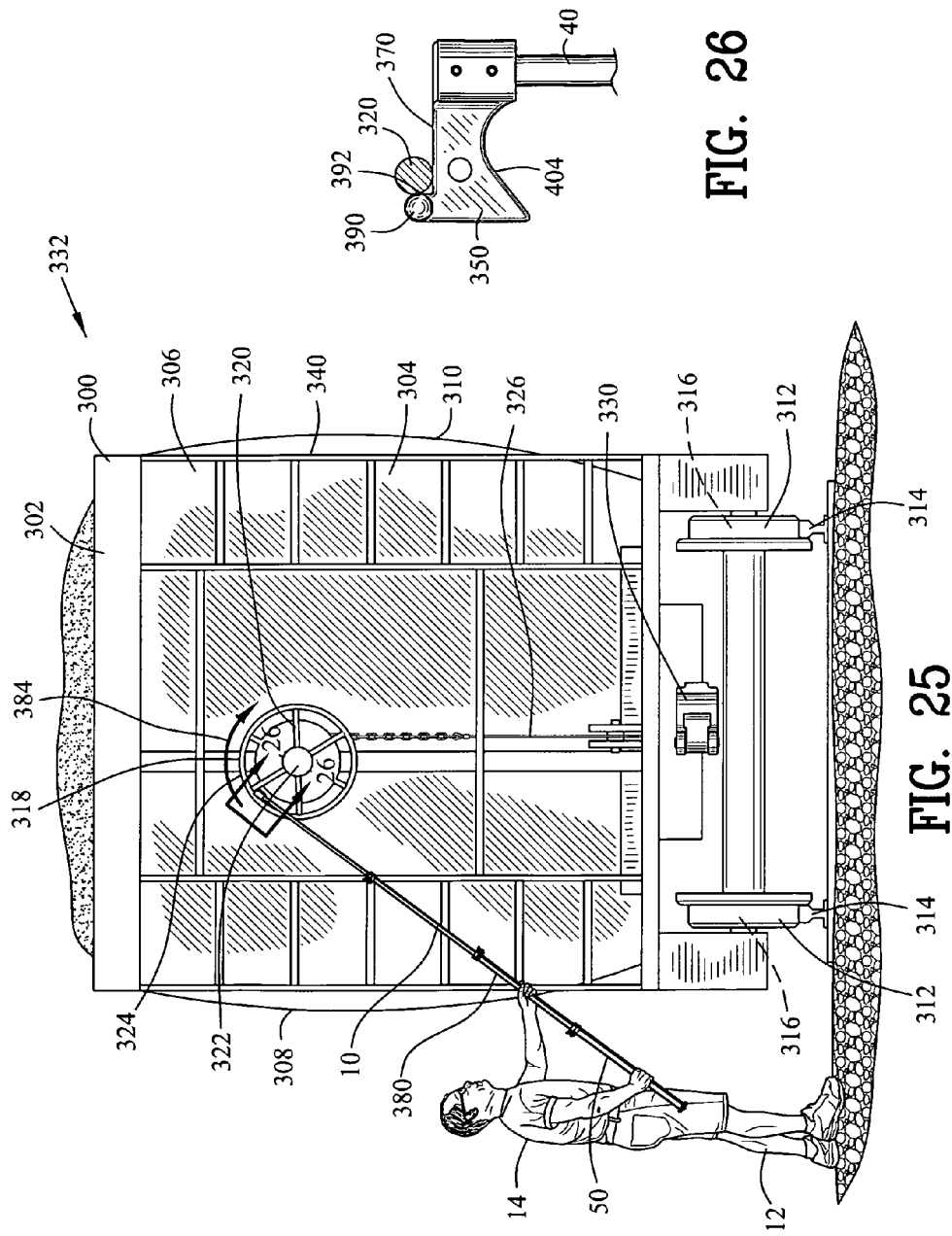

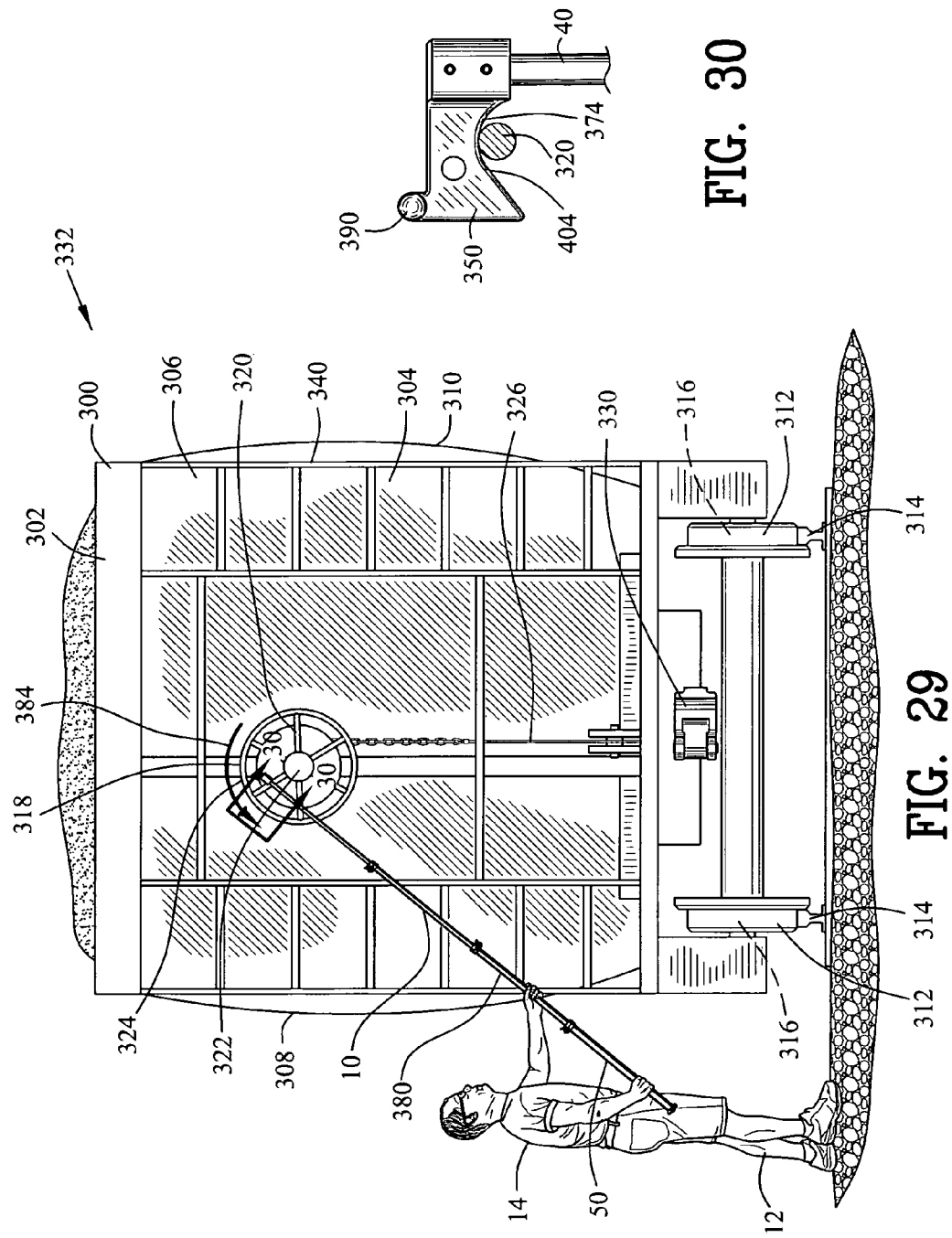

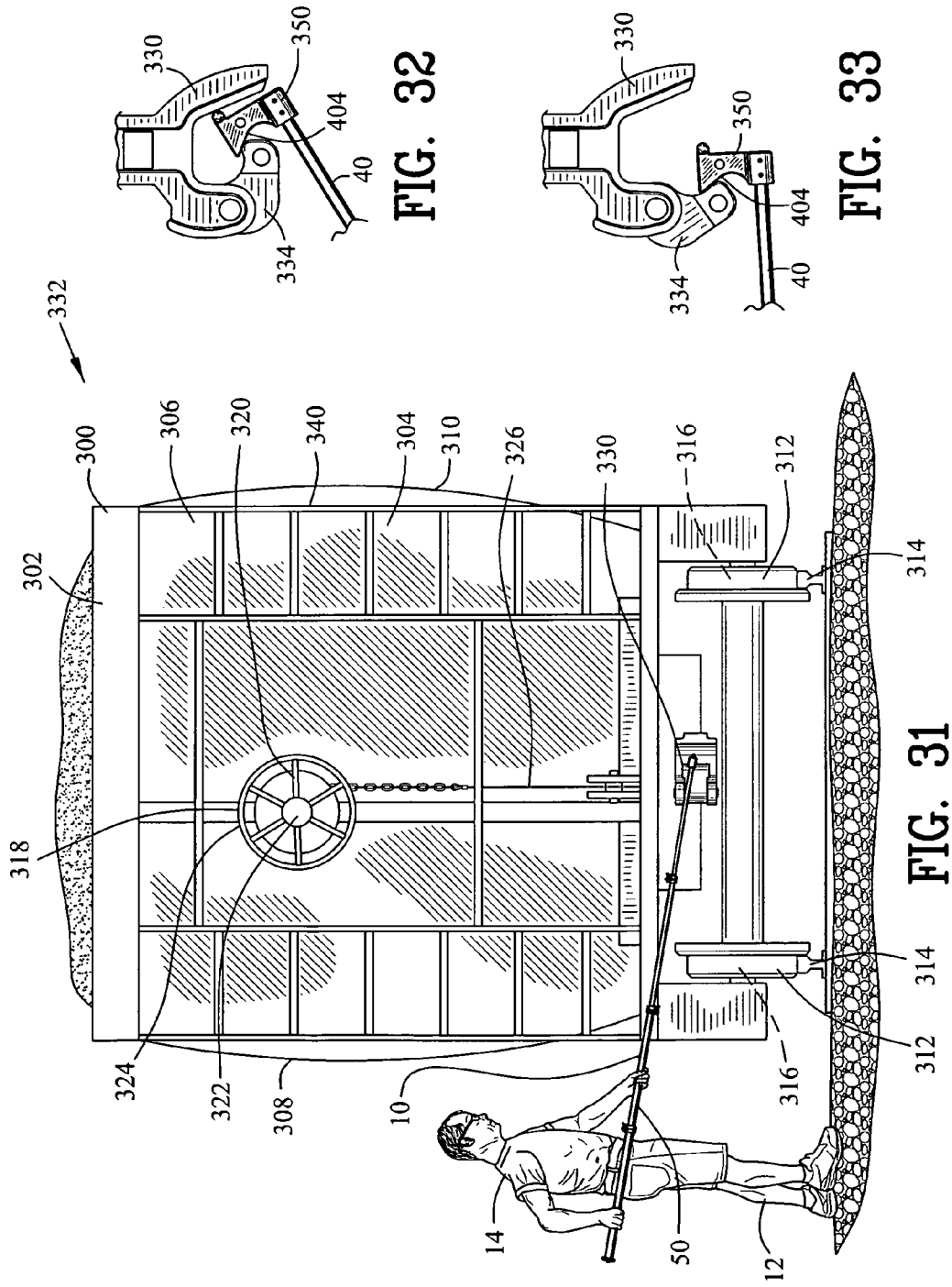

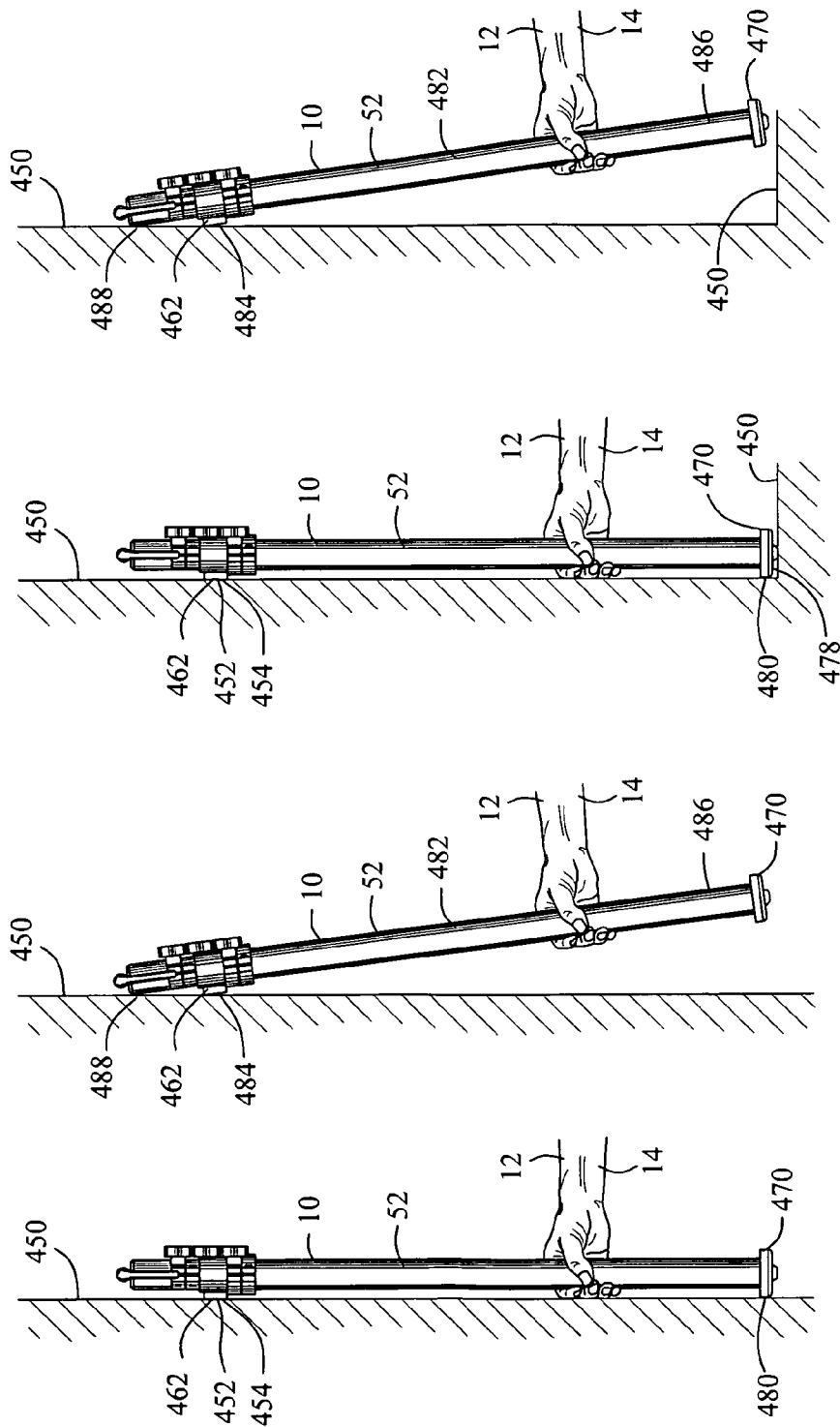

EXTENSION TOOL

CROSS-REFERENCE TO RELATED APPLICATIONS

This application claims benefit of U.S. Patent Provisional application No. 61/459,635 filed Dec. 16, 2010. All subject matter set forth in provisional application No. 61/459,635 filed Dec. 16, 2010 is hereby incorporated by reference into the present application as if fully set forth herein.

BACKGROUND OF THE INVENTION

1. Field of the Invention

This invention relates to tools and more particularly to the extension tool for displacing an object.

2. Background of the Invention

Various types of tools have been advised in the past for moving or rotating objects. One particular application of these tools is the rotation of a break actuator for a wheel brake located on a railroad car. Typically, the railroad car wheel break is actuated by rotating the break actuator. The break actuator may include a wheel having a plurality of spokes extending from a central hub. The rotation of the wheel rotates the hub and a shaft attached thereto for manually engaging a brake shoe to a surface of the railroad car wheel. The engagement of the brake shoe against the railroad car wheel prevents undesired movement of the railroad train car.

In most cases, the break actuator is located on the upper end of the railroad car. This necessitated the railroad employee to climb a ladder between typically two adjacent railroad cars to rotate the wheel on each of the railroad cars. Thereafter, the employee must descend the latter to move to the next railroad car climb the ladder and rotate the wheel in a similar pattern.

This procedure is very time consuming and possibly dangerous activity since the railroad employee is required to climb the ladders on each of the railroad cars which are in many cases located between two adjacent railroad cars. The following U.S. Patents are examples of attempts of the prior art to solve these problems.

U.S. Pat. No. 684,858 to Pearson discloses a wire fence tool comprising a handle, a hatchet-blade thereon having a disk-shaped facial recess in one side. A wire-cutter is seated in the recess and forms a flush portion of the hatchet-blade. An opening lever-handle is connected with the cutter-disk and a retaining loop for the lever-handle. The hatchet-blade and cutter-disk are provided with registering wire-receiving notches.

U.S. Pat. No. 872,271 to Benet discloses a device combining a pair of members connected pivotally together and provided with claws for the purpose of gripping a nail or the like. One of the members is provided with a longitudinal portion for increasing the leverage between the claws. The longitudinal portion terminates at one of its ends in a screw driver blade having a sharp portion and also having shoulders disposed upon opposite sides of the sharp portion. A handle is mounted telescopically upon the longitudinal portion of the blade and is provided with a pair of oppositely disposed impact surfaces for engaging the shoulders and receiving therefrom the force of impact so as to avoid injury to the sharp portion of the screw driver blade.

U.S. Pat. No. 4,646,378 to Borden discloses a combination tool comprising a first and a second tool members with hinge structure pivotally securing the first and the second members together so that they may be selectively pivoted between opened and closed positions of use wherein. The first tool member includes a pair of spaced-apart generally parallel extending side walls forming a sheath portion between which the second tool member may be folded or enclosed in closed position thereof. The first tool member also includes a first tool portion and a first bridge portion at one end thereof and a second bridge portion adjacent the other end thereof but intermediate these ends. The first and second bridge also extend between and integrally connecting side walls. The second tool member includes a second and third tool portions at opposite ends thereof and an intermediate region adjacent the second tool portion with this intermediate region being disposed between the side walls and hingedly assembled adjacent the other end of the first tool member, wherein in the folded or closed position of the combination tool, the second tool member is disposed between the side walls and resting on the bridge portions and the second and third tool portions extend beyond the opposite ends of the first tool member and the first tool portion is disposed in exposed condition so that all three tool portions are available for use in both the opened and folded or closed conditions of the tool members.

U.S. Pat. No. 4,715,252 to Pella discloses a device for safely rotating the wheel of a large or hard-to-turn valve. The wrench comprises an elongated handle, and a wheel grip. The wheel grip further consists of a rim grip and a spoke grip. The rim grip extends upwardly (when viewed from above) around the bottom of the rim of a valve wheel. The spoke grip extends downwardly, first around the rim of the wheel, then inwardly, so as to grasp the spoke of the valve wheel.

U.S. Pat. No. 4,991,469 to Pella discloses a device for safely rotating the handwheel of hard-to-turn valves has an elongate handle terminating in a fixed wheel-rim-engaging jaw. A movable wheel-engaging jaw is pivotally attached to the handle behind the fixed jaw. When the movable jaw is applied to the inner surface of the handwheel rim and the fixed jaw is applied to the outer surface of the rim, turning force on the handle forces the two jaws together by a leveraged force to enhance gripping of the rim while turning the wheel. Protuberances on the movable jaw enhance gripping the wheel rim and spoke.

U.S. Pat. No. 5,481,950 to Browning discloses a rigid head extending laterally from an adjustable handle has an elongate slot therethrough aligned with the longitudinal axis, of the handle for receiving and operating the handle of a valve. A first concave surface is formed in the upper edge of the head for pushing on the spokes of a brake wheel. The first concave surface has opposite ends of similar slope approaching ninety degrees relative to the upper edge for pushing on the spokes of a brake wheel and preventing kick-out of the tool from the brake wheel. A second concave surface is formed in the lower edge of the head for pulling on the spokes of a brake wheel. A first end of the second concave surface has a slope approaching ninety degrees relative to the lower edge of the head which is significantly less than the slope of the first end to facilitate kick-out of the tool while the brake wheel is in motion. The second concave surface slopes to a point where it joins the outer edge of the head to define a point adapted to fit within a hole in a knuckle of a railroad car.

Although the aforementioned prior art have contributed to the development of the art of tools, none of these prior art patents have solved the needs of the art.

Therefore, is an object of this invention to provide an improved tool for rotating the break actuator of a railroad car for actuating a wheel break.

Another object of this invention is to provide an improved tool for pivoting a knuckle coupler of a railroad car.

Another object of this invention is to provide an improved tool that is light weight and easy to carry.

Another object of this invention is to provide an improved tool that can be extended and retracted for varying the length of the tool.

Another object of this invention is to provide an improved tool that may be extended and retracted with a minimum resistance force.

Another object of this invention is to provide an improved tool that may be extended and retracted without jamming.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention an relates to an improved extension tool. The extension tool comprises a first pole defining an interior bore and a first exterior surface with the first pole extending between a first end and a second end. A second pole defines a second exterior surface with the second pole extending between a first end and a second end. The second pole is partially disposed in the first pole for defining a variable overall tool length. A slide controller includes a lower clamp and an upper clamp. The lower clamp has a primary arm and a secondary arm for defining a first coupler interior bore. The upper clamp has a primary arm and a secondary arm for defining a second coupler interior bore. The second end of the first pole is disposed in the first coupler interior bore of the lower clamp. A first clamp compressor extends between the primary arm and the secondary arm of the lower clamp and applying a compressive force between the primary arm and the secondary arm for defining a lower clamp lock and coupling the slide controller with the first pole. A second clamp compressor extends between the primary arm and the secondary arm of the upper clamp and applying a compressive force between the primary arm and the secondary arm for defining an upper clamp lock and preventing slidable displacement of the second pole relative to the first pole. The second clamp compressor applies a non-compressive force between the primary arm and the secondary arm for the upper clamp defining an upper slide guide. The upper slide guide facilitates the slidable displacement of the second pole relative to the first pole.

In a more specific embodiment of the invention, a bushing defines an internal bore and an exterior surface. The first end of the second pole is disposed and coupled to the internal bore of the bushing. The exterior surface of the bushing slidably engages with the interior bore of the first pole for defining a lower slide guide. The lower slide guide and the upper slide guide facilitate the slidable displacement of the second pole relative to the first pole.

In another embodiment of the invention, a third pole defines an interior bore and a third exterior surface with the third pole extending between a first end and a second end. The first pole is partially disposed in the third pole for defining a second variable overall tool length. A second slide controller includes a second lower clamp and an second upper clamp. The second lower clamp has a primary arm and a secondary arm for defining an third coupler interior bore. The second upper clamp has a primary arm and a secondary arm for defining an fourth coupler interior bore. The second end of the third pole is disposed in the third coupler interior bore of the second lower clamp. A third clamp compressor extends between the primary arm and the secondary arm of the second lower clamp and applies a compressive force between the primary arm and the secondary arm for defining a second lower clamp lock and coupling the second slide controller with the third pole. A fourth clamp compressor extends between the primary arm and the secondary arm of the second upper clamp and applies a compressive force between the primary arm and the secondary arm for defining an second upper clamp lock and preventing slidable displacement of the first pole relative to the third pole. The fourth clamp compressor applies a non-compressive force between the primary arm and the secondary arm for the second upper clamp defining a second upper slide guide. The second upper slide guide facilitating the slidable displacement of the first pole relative to the third pole.

In a more specific embodiment of the invention, a slide magnetic or first magnetic is coupled to the slide controller. The slide magnetic includes a disc shape defining a field area and an edge area. The field area of the slide magnetic is coupled to the slide controller for providing a field contact area between the field area of the slide magnetic and a metallic surface. The slide magnetic temporarily secures the extension tool to the metallic surface.

In another embodiment of the invention, a tool is mounted on the second end of the second pole for engaging an object. The tool comprises a handle extending between a first end and a second end. A tool head has a mounting portion and a working portion. The mounting portion defines a mounting bore and an exterior mounting surface. The second end of the handle is disposed in the mounting bore of the tool head for coupling the handle to the tool head. The working portion includes a plate extending from the exterior mounting surface of the mounting portion. The plate defines a first side, a second side, a top edge, a side edge and a bottom edge. A riser body extends from the top edge of the plate. The riser body and the top edge of the plate define a generally L-shaped channel for receiving the object and maintaining the object against the tool head.

In a more specific embodiment of the invention, a guard cover has a bottom shield plate coupled with a first side shield plate and a second side shield plate for defining a generally U-shaped shield channel. The guard cover includes an arcuate shape for positioning the bottom edge of the plate within the generally U-shaped shield channel. A couple maintains the guard cover to the plate. The guard cover protects the plate from damage due to engagement between the tool head and the object.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 6 is a front side view of a second pole of FIG. 1;

FIG. 7 is a front side view of a first pole of FIG. 1;

FIG. 8 is a front side view of a third pole of FIG. 1;

FIG. 9 is a front side view of a fourth pole of FIG. 1;

FIG. 25 illustrates the extension tool in the fully extended length and engaging a brake wheel of a railroad car for producing a clockwise rotation of the brake wheel;

FIG. 26 is a sectional view along line 26-26 in FIG. 25 illustrating a generally L-shaped channel of the head tool receiving and maintaining the brake wheel against the tool head;

FIG. 29 is a view similar to FIG. 25 illustrating the extension tool engaging the brake wheel of a railroad car for producing a counter clockwise rotation of the brake wheel;

FIG. 30 is a sectional view along line 30-30 in FIG. 29 illustrating an arcuate recess of the tool head receiving and maintaining the brake wheel against the tool head;

FIG. 31 is a view similar to FIG. 25 illustrating the extension tool in the fully extended length and engaging a knuckle coupler of a railroad car;

FIG. 32 is a top view of a portion of FIG. 31 illustrating the tool head engaged with the knuckle coupler of a railroad car;

FIG. 33 is a view similar to FIG. 32 illustrating the arcuate recess of the tool head receiving and maintaining the brake wheel against the tool head and producing a clockwise pivoting of the knuckle coupler of the railroad car;

FIG. 34 is a side view of a vertical metallic surface wherein a slide magnetic and a pole magnetic temporarily secure the extension tool to the vertical metallic surface;

FIG. 35 is a view similar to FIG. 34 illustrating the separation of the extension tool from the vertical metallic surface by first separating the pole magnetic from the vertical metallic surface and second separating the slide magnetic from the vertical metallic surface;

FIG. 36 is a view similar to FIG. 34 illustrating both a vertical metallic surface and a horizontal metallic surface wherein a slide magnetic temporarily secures the extension tool to the vertical metallic surface and a pole magnetic temporarily secures the extension tool to both the vertical metallic surface and the horizontal metallic surface;

FIG. 37 is a view similar to FIG. 36 illustrating the separation of the extension tool from both the vertical metallic surface and the horizontal metallic surface by first separating the pole magnetic from both the horizontal metallic surface and the vertical metallic surface and second separating the slide magnetic from the vertical metallic surface;

Similar reference characters refer to similar parts throughout the several Figures of the drawings.

DETAILED DISCUSSION

FIGS. 1-45 are various views of an extension tool 10. The extension tool 10 may be utilized for engaging a railroad car 300 as shown in FIGS. 25-33, however the extension tool 10 may be utilized as a support between two objects, for distancing an object from another object, or for applying a force upon an object that is distanced from another object.

Figure 2:
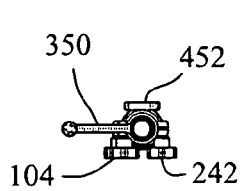
FIG. 2 is a top view of FIG. 1.
Figure 1:
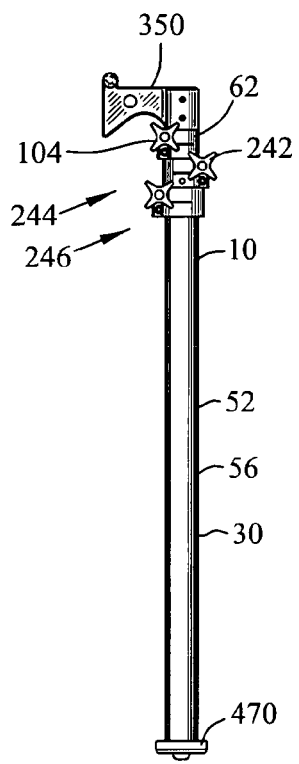
FIG. 1 is a front side view of an extension tool in a fully contracted length of the present invention.
Figure 4:
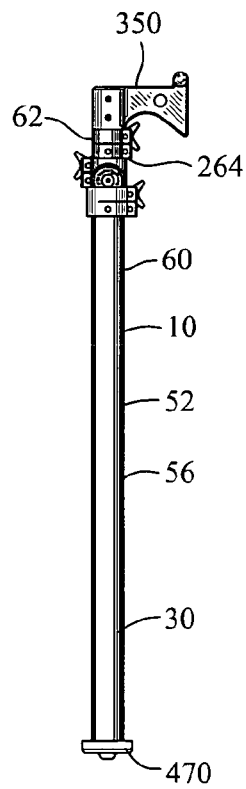
FIG. 4 is a rear side view of FIG. 1.
Figure 3:
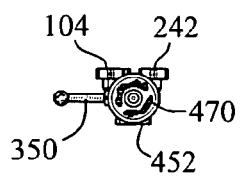
FIG. 3 is a bottom view of FIG. 1.

As best shown in FIGS. 1-24, the extension tool 10 comprises a first pole 20 defining a first interior bore 22 and a first exterior surface 24 with the first pole extending between a first end 26 and a second end 28. A second pole 40 defines a second interior bore 42 and a second exterior surface 44 with the second pole 40 extending between a first end 46 and a second end 48. The second pole 40 is partially disposed in the first pole 20 for defining a variable overall tool length 60. As the second pole 40 is withdrawn from the first pole 20, the variable overall tool length 60 increases as best shown in FIGS. 5, 7, 25, 29, 31 and 44. As the second pole 40 is inserted into the first pole 20, the variable overall tool length 60 decreases as best shown in FIGS. 1 and 4.

FIGS. 1-5, 13-19, and 23-24 disclose a slide controller 62. The slide controller 62 includes a lower clamp 70 and an upper clamp 80. The lower clamp 70 has a primary arm 72 and a secondary arm 74 for defining a first coupler interior bore 76. The upper clamp 80 has a primary arm 82 and a secondary arm 84 for defining a second coupler interior bore 86. The slide controller 62 has a clamp back 66 that joins the lower clamp 70 with the upper clamp 80 and defines an integral one-piece unit 68. A clamp separator groove 69 divides the slide controller 62 between the lower clamp 70 and the upper clamp 80.

The second end 28 of the first pole 20 is disposed in the first coupler interior bore 76 of the lower clamp 70. A first clamp compressor 78 that may include a first bolt and nut fastener 79 or other hardware extends between the primary arm 72 and the secondary arm 74 of the lower clamp 70 through a clamp aperture 110. The first clamp compressor 78 applies a first compressive force 90 between the primary arm 72 and the secondary arm 74 for compressing the primary arm 72 and the secondary arm 74 against the first pole 20. Upon the primary arm 72 and the secondary arm 74 compressing against the first pole 20, the lower clamp 70 defines a lower clamp lock 92. The lower clamp lock 92 couples the slide controller 62 with the first pole 20. A set screw 64 threadably engaging the slide controller 62 and the first pole 20 may also be utilized for coupling the slide controller 62 with the second end 28 of the first pole 20.

A second clamp compressor 88 that may include a second bolt and nut fastener 89 or other hardware extends between the primary arm 82 and the secondary arm 84 of the upper clamp 80 through a clamp aperture 110. The second clamp compressor 88 applies a second compressive force 94 between the primary arm 82 and the secondary arm 84 for compressing the primary arm 82 and the secondary arm 84 against the second pole 40. Upon the primary arm 82 and the secondary arm 84 compressing against the second pole 40, the upper clamp 80 defines an upper clamp lock 96. The upper clamp lock 96 prevents slidable displacement of the second pole 40 relative to the first pole 20.

Alternatively, the second clamp compressor 88 may apply a non-compressive force 98 between the primary arm 82 and the secondary arm 74 for permitting the primary arm 82 and the secondary arm 84 to be distanced from the second pole 40. Upon the primary arm 82 and the secondary arm 84 being distanced from the second pole 40, the upper clamp 80 defines an upper slide guide 100. The upper slide guide 100 facilitates the slidable displacement of the second pole 40 relative to the first pole 20. By sliding the second pole 40 relative to the first pole 20, the extension tool 10 may be positioned between an extended length 50 and a retracted length 52 for varying the overall length of the extension tool 10.

As best shown in FIGS. 1-5 and 16-19, a control knob 102 may be coupled to the second clamp compressor 88 for improving gripping of the second clamp compressor 88 and increasing the rotational force applied to the second clamp compressor 88 to increase the second compressive force 94 between the primary arm 82 and the secondary arm 84 of the upper clamp 80. The control knob 102 may include a star knob 104 or other mechanical knobs.

Figure 16:
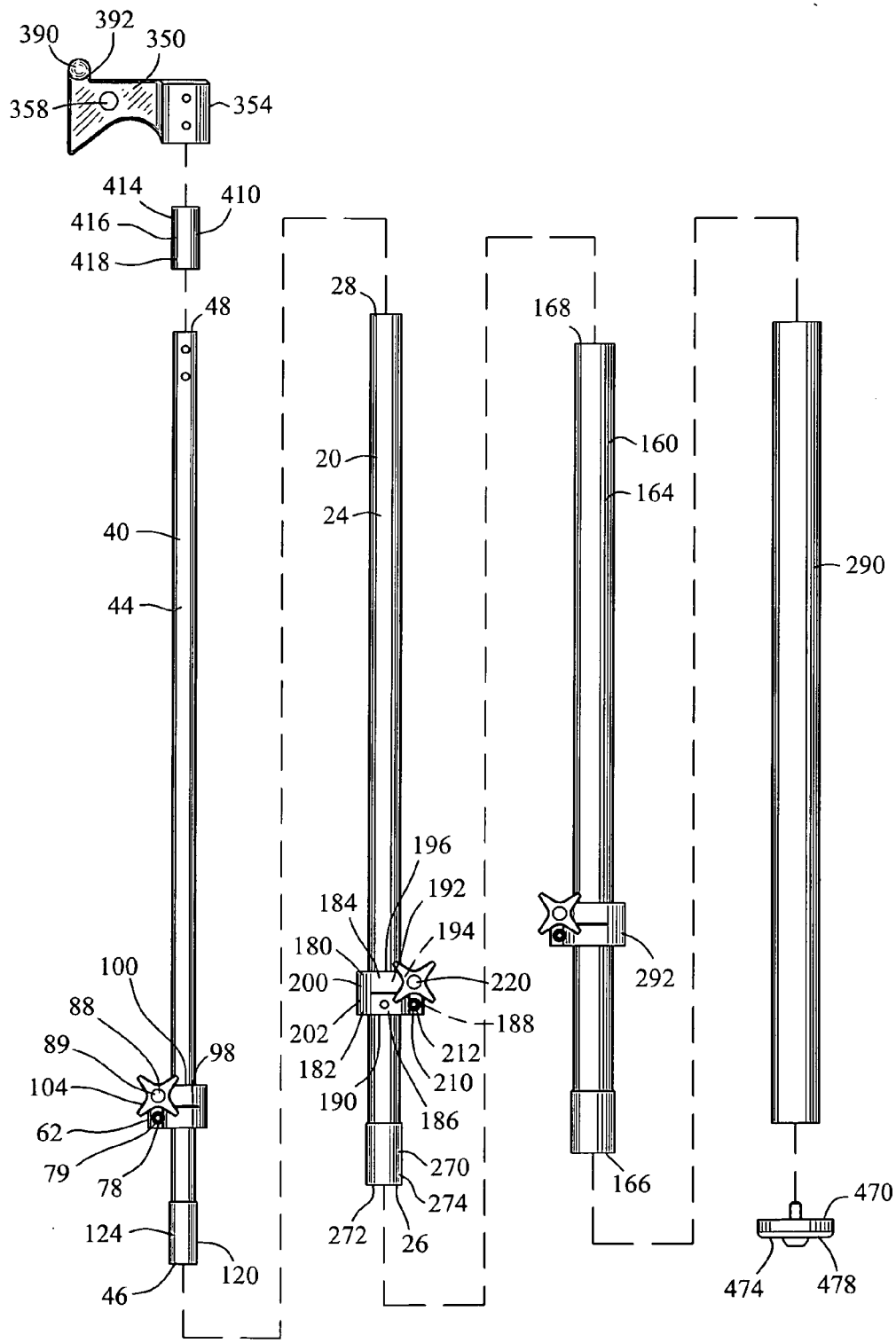
FIG. 16 is an exploded view of FIG. 1.
Figure 17:
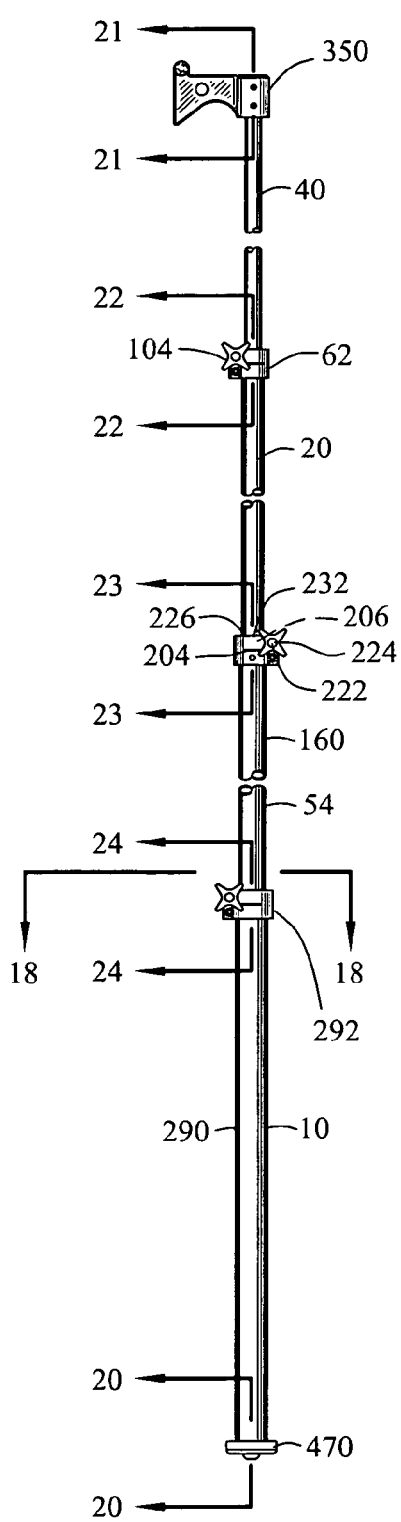
FIG. 17 a view similar to FIG. 1 illustrating the extension tool in a fully extended length.
Figure 18:
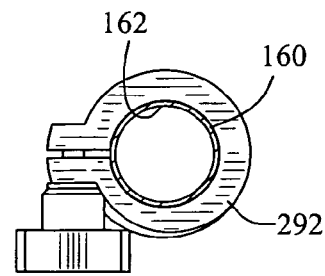
FIG. 18 is a sectional view along line 18-18 in FIG. 17.
Figure 19:
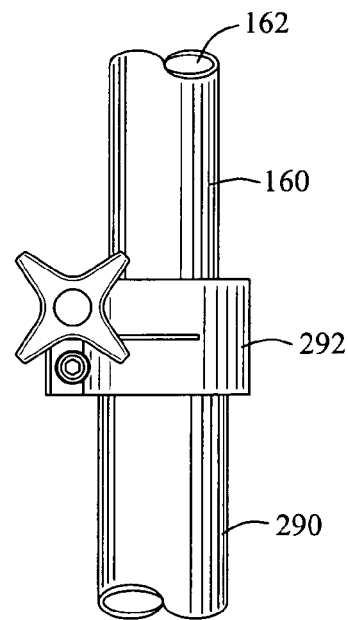
FIG. 19 is an enlarged view of a potion of FIG. 17.
Figure 20:
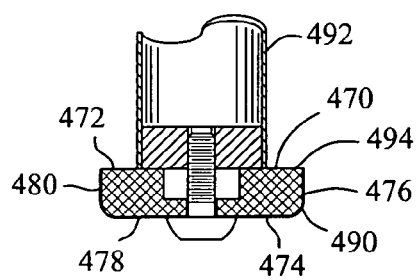
FIG. 20 is a sectional view along line 20-20 in FIG. 17.
Figure 22:
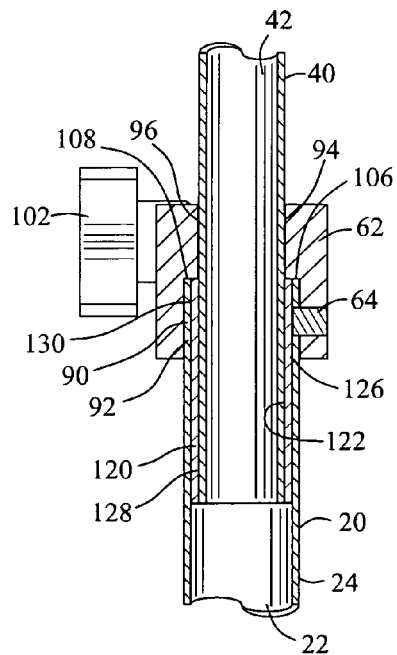
FIG. 22 is a sectional view along line 22-22 in FIG. 17.
Figure 24:
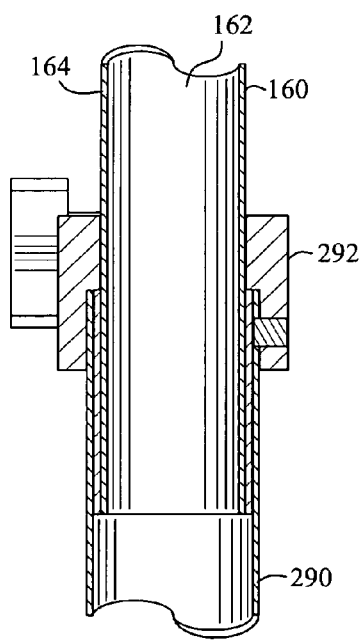
FIG. 24 is a sectional view along line 24-24 in FIG. 17.
Figure 28:
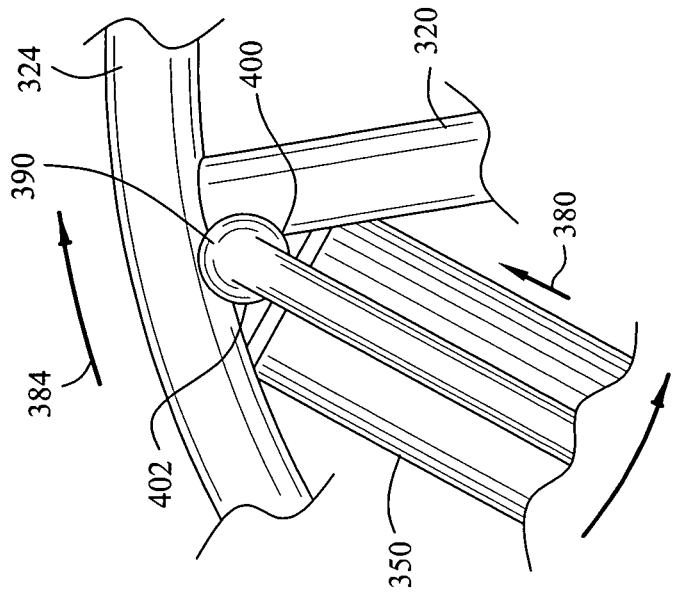
FIG. 28 is a view similar to FIG. 27 illustrating the spherical body of the tool head receiving and maintaining the brake wheel against the tool head during both a vertical and horizontal ascending force transmitted from the extension tool to the brake wheel.
Figure 27:
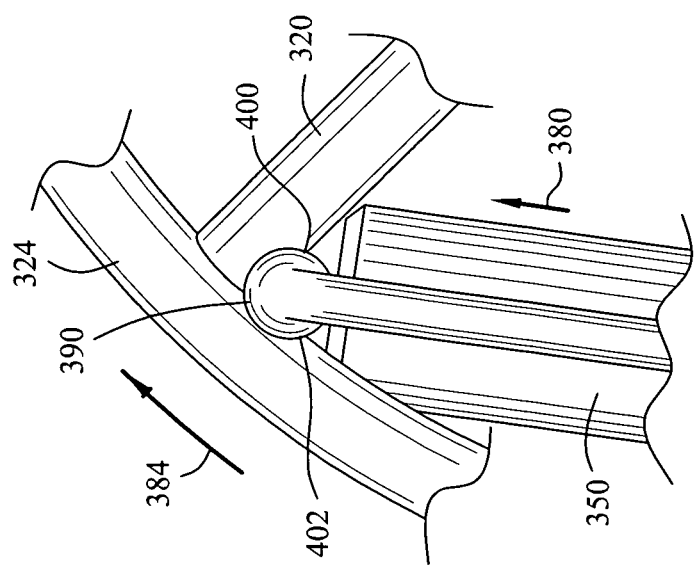
FIG. 27 is a rear view of the brake wheel of FIG. 25 illustrating a spherical body of the tool head receiving and maintaining the brake wheel against the tool head during a vertical ascending force transmitted from the extension tool to the brake wheel.
Figure 39:
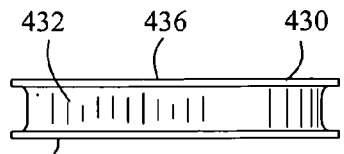
FIG. 39 is a top view of FIG. 38.
Figure 40:
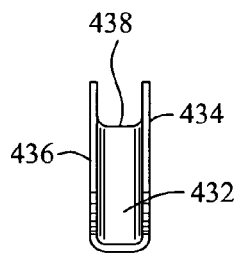
FIG. 40 is a front view of FIG. 38.
Figure 38:
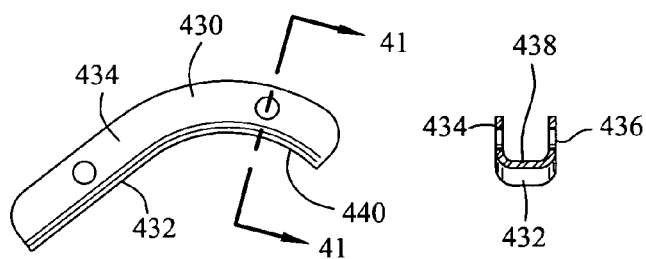
FIG. 38 is a side view of a guard cover for protecting the tool head.
Figure 41:
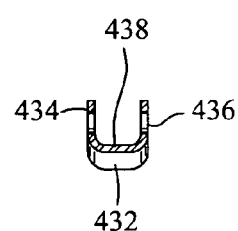
FIG. 41 is a sectional view along line 41-41 in FIG. 38.
Figure 43:
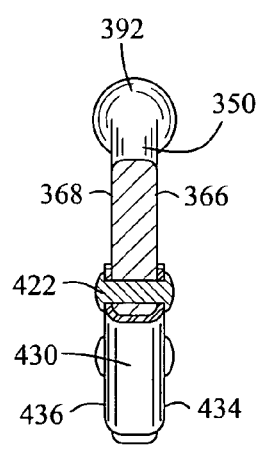
FIG. 43 is a sectional view along line 43-43 in FIG. 42.
Figure 42:
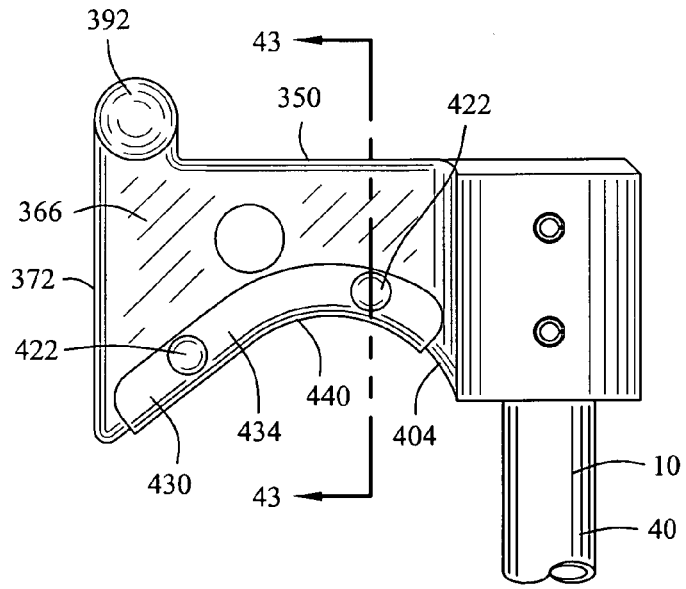
FIG. 42 is a view similar to FIG. 38 illustrating the guard cover coupled with the tool head.
Figures 44, 45:
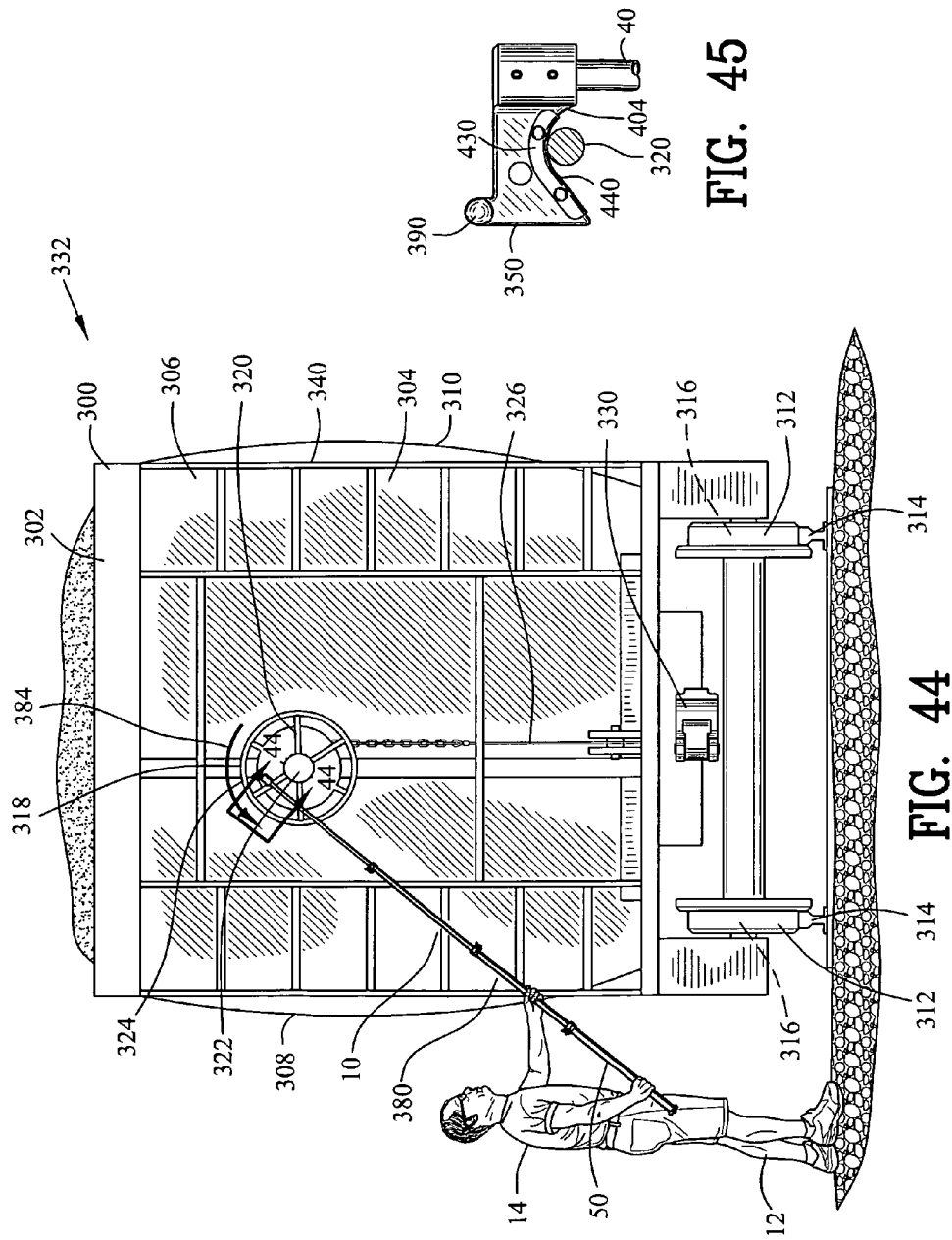
FIG. 44 is a view similar to FIG. 25 illustrating the extension tool engaging the brake wheel of a railroad car for producing a counter clockwise rotation of the brake wheel.
FIG. 45 is a sectional view along line 45-45 in FIG. 44 illustrating the guard cover protecting the tool head during the extension tool engaging the brake wheel of a railroad car.

FIGS. 6, 16 and 22 illustrate the extension tool 10 including a bushing 120. The bushing 120 defines an internal bore 122 and an exterior surface 124. The first end 46 of the second pole 40 is disposed and coupled to the internal bore 122 of the bushing 120. The bushing 120 may be secured to the second pole 40 by an adhesive, set pin and/or other securing devices. The exterior surface 124 of the bushing 120 slidably engages with the interior bore 22 of the first pole 22 for defining a lower slide guide 126. The lower slide guide 126 and the upper slide guide 100 facilitate the slidable displacement of the second pole 40 relative to the first pole 20 by maintaining an alignment between the first pole 20 and the second pole 40 for preventing binding between the first pole 20 and the second pole 40 during displacement of the second pole 40 relative to the first pole 20.

Preferably, the first pole 20 and the second pole 40 are formed of a metallic material such as steel, stainless steel, aluminum or other rigid materials. The bushing 120 is preferably is formed of a polymeric material. The metallic material in direct contact with the polymeric material creates a metallic to polymeric sliding engagement 128 between the first pole 20 and the second pole 40. The metallic to polymeric sliding engagement 128 reduces the friction binding between the first pole 20 and the second pole 40 during displacement of the second pole 40 relative to the first pole 20. The reduced friction between the first pole 20 and the second pole 40 reduces the force needed to displace the second pole 40 relative to the first pole 20.

Figure 15:
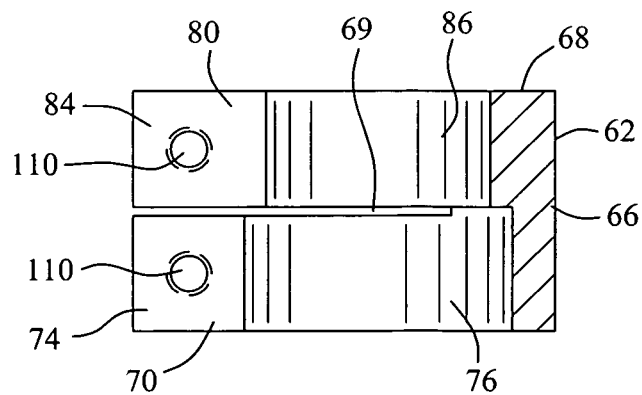
FIG. 15 is a sectional view along line 15-15 in FIG. 13.

As shown in FIGS. 15 and 22, the slide controller 62 includes an interior bore step 106 between and adjacent to the first coupler interior bore 76 of the lower clamp 70 and the second coupler interior bore 86 of the upper clamp 80. FIG. 22 illustrates that upon the bushing 120 contacting the interior bore step 106, the second pole 40 is prevented from being withdrawn further from the first pole 20 and thereby terminating any further increase in the variable overall tool length 60. As such the interior bore step 106 defines an extended slide stop 108 upon the bushing 120 contacting the interior bore step 106 for terminating the slidable displacement of the second pole 40 relative to the first pole 20.

During the positioning of the second pole 40 and the first pole 20 in the extended slide stop 108 position as shown in FIG. 22, the second pole 40 and bushing 120 make continuous contact with the upper clamp 80 of the slide controller 62, the extended slide stop 108 and the first pole 20 for defining a stabilizing seat 130 for resisting bending between the first pole 20 and the second pole 40.

FIGS. 1-9, 16, 17, 23, 25, 29, 31 and 34-37 illustrate a third pole 160 and second slide controller 180 for creating a second variable overall tool length 150 in the extension tool 10. The third pole 160 defines a third interior bore 162 and a third exterior surface 164 with the third pole 160 extending between a first end 166 and a second end 168. The first pole 20 is partially disposed in the third pole 160 for defining the second variable overall tool length 150. As the first pole 20 is withdrawn from the third pole 160, the second variable overall tool length 150 increases as best shown in FIGS. 5, 7, 25, 29, 31 and 44. As the first pole 20 is inserted into the third pole 160, the second variable overall tool length 150 decreases as best shown in FIGS. 1 and 4.

FIGS. 1-5, 13-19, and 23-24 disclose the second slide controller 180. The second slide controller 180 includes a second lower clamp 182 and a second upper clamp 184. The second lower clamp 182 has a primary arm 186 and a secondary arm 188 for defining a third coupler interior bore 190. The second upper clamp 184 has a primary arm 192 and a secondary arm 194 for defining a fourth coupler interior bore 196. The second slide controller 180 has a second clamp back 200 that joins the second lower clamp 182 with the second upper clamp 184 and defines a second integral one-piece unit 202. A second clamp separator groove 204 divides the second slide controller 180 between the second lower clamp 182 and the second upper clamp 184.

The second end 168 of the third pole 160 is disposed in the third coupler interior bore 190 of the second lower clamp 182. A third clamp compressor 210 that may include a third bolt and nut fastener 212 or other hardware extends between the primary arm 192 and the secondary arm 194 of the second lower clamp 182 through a clamp aperture 110. The third clamp compressor 210 applies a third compressive force 214 between the primary arm 186 and the secondary arm 188 for compressing the primary arm 186 and the secondary arm 188 against the third pole 160. Upon the primary arm 186 and the secondary arm 188 compressing against the third pole 160, the second lower clamp 182 defines a second lower clamp lock 216. The second lower clamp lock 216 couples the second slide controller 180 with the third pole 160. A set screw 64 threadably engaging the second slide controller 180 and the third pole 160 may also be utilized for coupling the second slide controller 180 with the second end 28 of the third pole 160.

A fourth clamp compressor 220 that may include a fourth bolt and nut fastener 222 or other hardware extends between the primary arm 192 and the secondary arm 194 of the second upper clamp 184 through a clamp aperture 110. The fourth clamp compressor 220 applies a fourth compressive force 224 between the primary arm 192 and the secondary arm 194 for compressing the primary arm 192 and the secondary arm 194 against the first pole 20. Upon the primary arm 192 and the secondary arm 194 compressing against the first pole 20, the second upper clamp 184 defines a second upper clamp lock 226. The second upper clamp lock 226 prevents slidable displacement of the first pole 20 relative to the third pole 160.

Alternatively, the fourth clamp compressor 220 may apply a second non-compressive force 230 between the primary arm 192 and the secondary arm 194 for permitting the primary arm 192 and the secondary arm 194 to be distanced from the first pole 20. Upon the primary arm 192 and the secondary arm 194 being distanced from the first pole 20, the second upper clamp 184 defines a second upper slide guide 232. The second upper slide guide 232 facilitates the slidable displacement of the first pole 20 relative to the third pole 160. By sliding the first pole 20 relative to the third pole 160, the extension tool 10 may be positioned between an second extended length 55 and a second retracted length 56 for varying the overall length of the extension tool 10.

As best shown in FIGS. 1-5 and 16-19, a second control knob 240 may be coupled to the fourth clamp compressor 220 for improving gripping of the fourth clamp compressor 220 and increasing the rotational force applied to the fourth clamp compressor 220 to increase the second fourth compressive force 224 between the primary arm 192 and the secondary arm 194 of the second upper clamp 184. The second control knob 240 may include a second star knob 242 or other mechanical knobs. As shown in FIGS. 1, 4, 5, 16 and 17, the slide controller 62 and the second slide controller 240 have an inverted orientation 244 relative to the first pole 20. The inverted orientation 244 provides a staggered orientation 246 of the control knob 102 and the second control knob 240 for permitting the abutment of the slide controller 62 with the second slide controller 240 and a larger control knob 102 and second control knob 240.

As best shown in FIGS. 1, 4 and 16 the slide controller 62 includes a lower break surface 260 and the second slide controller 180 includes an upper break surface 262. The lower break surface 260 and the upper break 262 surface define a contracted slide stop 264 upon the lower break surface 260 contacting the upper break surface 262. The contracted slide stop 264 terminates the slidable displacement of the first pole 20 relative to the third pole 160.

Figure 23:
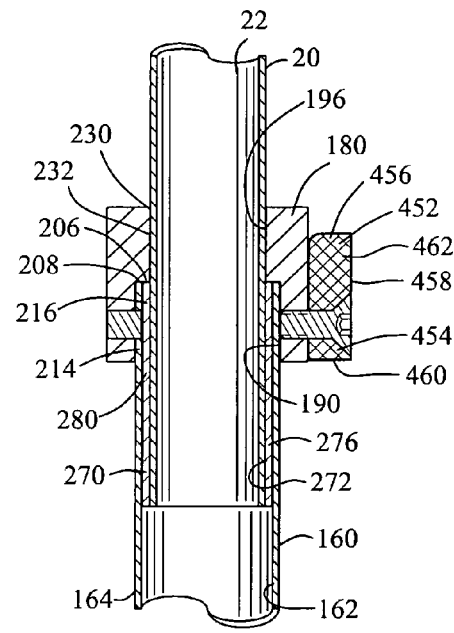
FIG. 23 is a sectional view along line 23-23 in FIG. 17.

FIGS. 6, 16 and 23 illustrate the extension tool 10 including a second bushing 270. The second bushing 270 defines an internal bore 272 and an exterior surface 274. The first end 26 of the first pole 20 is disposed and coupled to the internal bore 272 of the second bushing 270. The second bushing 270 may be secured to the first pole 20 by an adhesive, set pin and/or other securing devices. The exterior surface 274 of the second bushing 270 slidably engages with the interior bore 162 of the third pole 160 for defining a second lower slide guide 276.

The second lower slide guide 276 and the second upper slide guide 232 facilitate the slidable displacement of the first pole 20 relative to the third pole 160 by maintaining an alignment between the first pole 20 and the third pole 160 for preventing binding between the first pole 20 and the third pole 160 during displacement of the first pole 20 relative to the third pole 160.

Preferably, the third pole 160 is formed of a metallic material such as steel, stainless steel, aluminum or other rigid materials. The second bushing 270 is preferably is formed of a polymeric material. The metallic material in direct contact with the polymeric material creates a metallic to polymeric sliding engagement 128 between the first pole 20 and the third pole 160. The metallic to polymeric sliding engagement 128 reduces the friction binding between the first pole 20 and the third pole 160 during displacement of the first pole 20 relative to the third pole 160. The reduced friction between the first pole 20 and the third pole 160 reduces the force needed to displace the first pole 20 relative to the third pole 160.

As shown in FIG. 23, the second slide controller 180 includes a second interior bore step 206 between and adjacent to the third coupler interior bore 190 of the second lower clamp 182 and the fourth coupler interior bore 196 of the second upper clamp 184. Upon the second bushing 270 contacting the second interior bore step 206, the first pole 20 is prevented from being withdrawn further from the third pole 160 and thereby terminating any further increase in the second variable overall tool length 150. As such the second interior bore step 206 defines an second extended slide stop 208 upon the second bushing 270 contacting the second interior bore step 206 for terminating the slidable displacement of the first pole 20 relative to the third pole 160.

During the positioning of the first pole 20 and the third pole 160 in the second extended slide stop 208 position as shown in FIG. 23, the first pole 20 and second bushing 270 make continuous contact with the second upper clamp 184 of the second slide controller 180, the second extended slide stop 208 and the third pole 160 for defining a second stabilizing seat 280 for resisting bending between the first pole 20 and the third pole 160.

Figure 5:
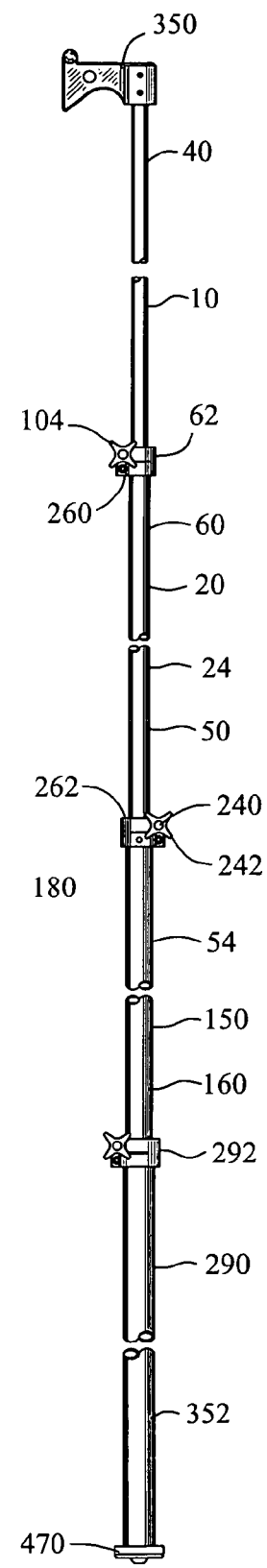
FIG. 5 is a view similar to FIG. 1 illustrating the extension tool in an intermediate length.
Figure 12:
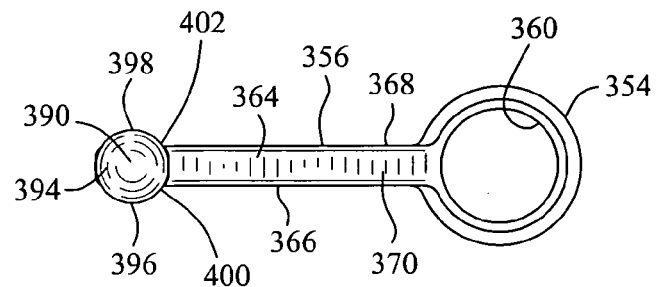
FIG. 12 is a top view of FIG. 10.
Figures 10, 11:
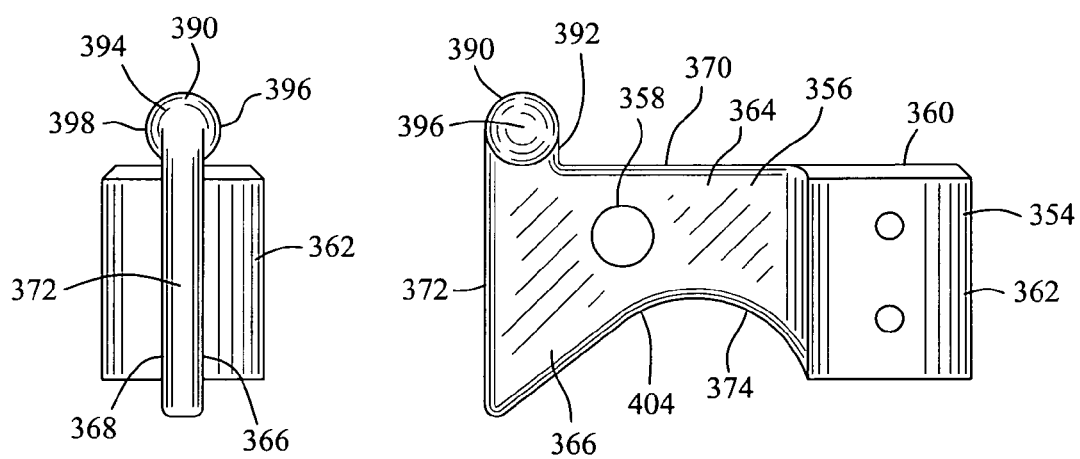
FIG. 10 is a front side view of a tool head of FIG. 1.
FIG. 11 is a front side view of FIG. 10.
Figure 13:
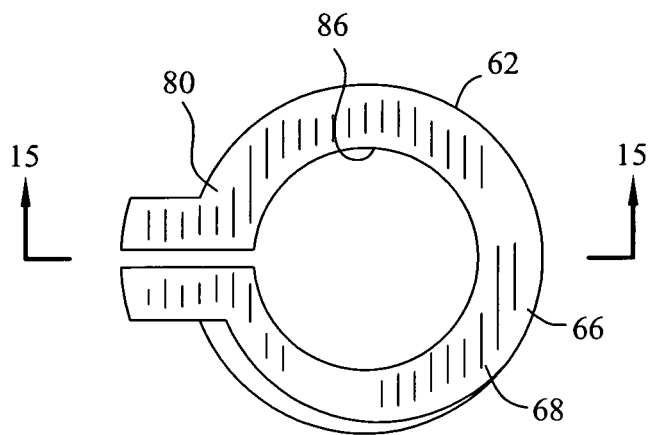
FIG. 13 is a top view of a slide controller of FIG. 1.
Figure 14:
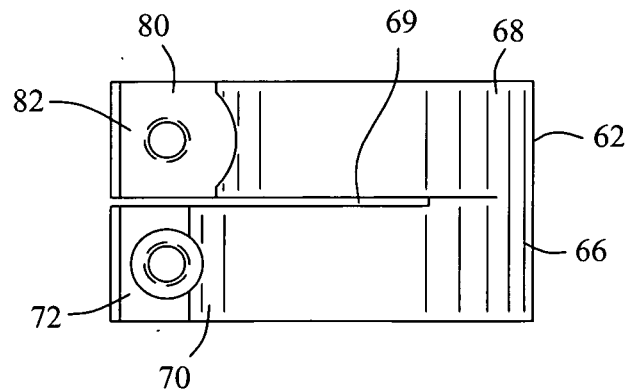
FIG. 14 is a side view of FIG. 13.

The extension tool 10 illustrated in FIGS. 1-45 includes a fourth pole 290 and a third slide controller 292. The fourth pole 170 and third slide controller 292 include all of the structural equivalents of the first and second poles 20, 40 and the first and second slide controllers 62, 180 respectively. The extension tool 10 may have an overall length of thirty-one (31) inches in the retracted length 52 as shown in FIGS. 1, 4 and 5 and an overall length of one hundred (100) inches in the extended length 50 as shown in FIGS. 25, 29 and 31. It should be understood that additional poles and slide controllers may be added to further extend the extension tool 10 in length.

FIGS. 25-33 illustrate the extension tool 10 engaging a railroad car 300. The railroad car 300 includes a container 302 having a front side 304, a rear side 306, a left side 308 and a right side 310. The railroad car 300 further includes a plurality of wheels 312 for rotatably engaging along a rail system 314. The plurality of wheels 312 support the container 302 and permitting the container 302 to be displaced to multiple locations. A brake 316 engages the plurality of wheels 312 for terminating rotation of the plurality of wheels 312. A wheel brake 318 is rotatably coupled to the railroad car 300. The wheel brake 300 has a plurality of spokes 320 extending between a central hub 322 and a circular rail 324. A brake linkage 326 couples the wheel brake 318 with the brake 316 such that upon rotation of the wheel brake 318 the brake 316 either compresses or expands relative to the plurality of wheels 312.

The front side 304 and/or the rear side 306 of the railroad car 300 include a knuckle coupler 330 for linking with a second railroad car 332. The knuckle coupler 330 has a generally J-shape hook 334 for linking with other generally J-shape hooks 334. The knuckle coupler 330 pivotably engages the railroad car 300 for permitting the generally J-shape hook 334 to be displaced during engagement with another generally J-shape hook 334.

In the past an individual 12 was required to ascend a railroad car latter 340 in order to rotate the wheel brake 318. Furthermore, prior to the coupling of the knuckle couplers 330, the individual 12 may be required to apply a horizontal force to the knuckle coupler 330 for pivoting the generally J-shape hooks 334. In the past, the individual 12 may have utilized their limbs 14 for pivoting the generally J-shape hooks 334. Having the individual 12 ascending the railroad car latter 340 and positioned in close proximity to the knuckle coupler 330 and the plurality of wheels 312 could prove highly dangerous by causing great bodily harm or death.

The extension tool 10 is utilized with a railroad car 300 as shown in FIGS. 25-33 by including a head tool 350 secured to the second end 48 of the second pole 40. The first pole 20 defines a handle 352 wherein the individual 12 can grasp the extension tool 10. The exterior surface 24 of the first pole 20 may have a textured surface 30 for assisting in grasping the extension tool 10.

As best shown in FIGS. 1-5 and 10-12, 16, 21, 27, 28, 30, 32, 33 and 38-42, the tool head 350 has a mounting portion 354 and a working portion 356. The mounting portion 354 defines a mounting bore 360 and an exterior mounting surface 362. The second end 48 of the second pole 40 is disposed in the mounting bore 360 of the tool head 350 for coupling the second pole 40 to the tool head 350. The working portion 356 includes a plate 364 extending from the exterior mounting surface 362 of the mounting portion 354. The plate 364 defining a first side 366, a second side 368, a top edge 370, a side edge 372 and a bottom edge 374. The top edge 370 may be utilized for engaging the wheel brake 318, the knuckle coupler 330 or other object for transferring a pushing force 380 from the first pole 20 to the wheel brake 318, the knuckle coupler 330 or other object. More specifically, the top edge 370 may engage the wheel brake 318 of the railroad car 300 for transferring the pushing force 380 from the tool head 350 to the wheel brake 318 and causing a rotation 384. The bottom edge 374 may be utilized for engaging the wheel brake 318, the knuckle coupler 330 or other object for transferring a pulling force 382 from the first pole 20 to the wheel brake 318, the knuckle coupler 330 or other object. More specifically, the bottom edge 374 may engage the wheel brake 318 of the railroad car 300 for transferring the pulling force 382 from the tool head 350 to the wheel brake 318 and causing a rotation 384.

As best shown in FIGS. 10-12, 27 and 28, the head tool 350 may also include a riser body 390 extending from the top edge 370 of the plate 364. The riser body 390 and the top edge 370 of the plate 364 define a generally L-shaped channel 392 for receiving and maintaining the wheel brake 318, the knuckle coupler 330 or other objects against the tool head 350. The riser body may further include a spherical body 394 extending from the top edge 370 of the plate 364 and defining a first dome 396 adjacent to and extending beyond the first side 366 and a second dome 398 adjacent to and extending beyond the second side 368. The spherical body 394 and the top edge 370 of the plate 364 defining a generally L-shaped channel 392 for receiving and maintaining the wheel brake 318, the knuckle coupler 330 or other objects against the tool head 350. The first dome 396, the first side 366 and the top edge 370 define a first retainer 400 for further receiving and maintaining the wheel brake 318, the knuckle coupler 330 or other objects against the tool head 350. Similarly, the second dome 398, the second side 368 and the top edge 370 define a second retainer 402 for further receiving and maintaining the wheel brake 318, the knuckle coupler 330 or other objects against the tool head 350. The bottom edge 374 may define an arcuate recess 404 for further receiving and maintaining the wheel brake 318, the knuckle coupler 330 or other objects against the tool head 350. More specifically, the arcuate recess 404 may encircle one of the plurality of spokes 320. The tool head 350 may further include a locking bore 358. The locking bore 358 traverses the working portion 356 for securing the extension tool 10 to the railroad car 300.

The tool head 350 may be constructed from an integral one piece unit from metallic material such as steel, stainless steel, aluminum, brass or other rigid materials. The tool head 350 constructed from brass would be beneficial to reduce sparks generated from contact between the tool head 350 and the wheel brake 318, the knuckle coupler 330 or other objects. The spark reduction characteristic of the tool head 350 would be significant if the extension tool 10 was utilized in a flammable environment.

Figure 21:
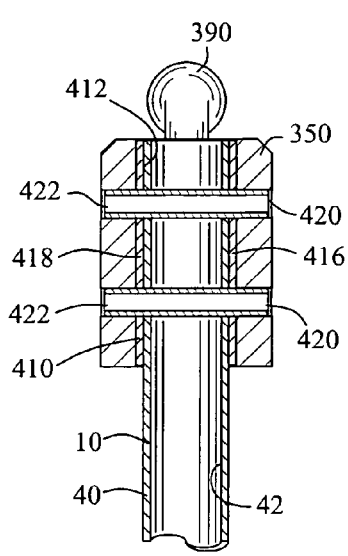
FIG. 21 is a sectional view along line 21-21 in FIG. 17.

As shown in FIGS. 16 and 21, a cylindrical insulating sleeve 410 may be positioned between the second end 48 of the second pole 40 and the tool head 350. The cylindrical insulating sleeve 410 defines an insulating sleeve bore 412 and an insulating exterior surface 414. The cylindrical insulating sleeve 410 is constructed from an insulator material 416 such as thermoplastic polymer or other insulating materials.

The second end 48 of the second pole 40 is disposed in the insulating sleeve bore 412 for frictionally coupling the second pole 40 to the cylindrical insulating sleeve 410. The cylindrical insulating sleeve 410 is further disposed in the mounting bore 360 of the tool head 350 for frictionally coupling the cylindrical insulating sleeve 410 to the tool head 350. The cylindrical insulating sleeve 410 is positioned between the second pole 40 and the tool head 350 for defining an insulator separator 418 for resisting the flow of electric charge between the second pole 40 and the tool head 350.

To mechanically couple the second pole 40 with both the cylindrical insulating sleeve 410 and tool head 350, a set pin 420 may traverse apertures in the mounting portion 354, the cylindrical insulating sleeve 410 and the second pole 40 for defining a mechanical couple 422 and preventing displacement between the mounting portion 354, the cylindrical insulating sleeve 410 and the second pole 40. The set pin 420 may be constructed of a metallic material. Alternatively, set pin 420 may be constructed of an insulator material 416 such as thermoplastic polymer or other insulating materials for resisting the flow of electric charge between the second pole 40 and the tool head 350.

If the head tool 350 is constructed from a metal that is subject to wear due to engagement between the head tool 350 and the wheel brake 318, the knuckle coupler 330 or other objects, the head tool 350 may include a guard cover 430 as shown in FIGS. 38-45. The guard cover 430 has a bottom shield plate 432 coupled with a first side shield plate 434 and a second side shield plate 436 for defining a generally U-shaped shield channel 438. The guard cover 430 includes an arcuate shape 440 for matching the bottom edge 374 of the plate 364 within the generally U-shaped shield channel 438. A couple 442 that may include a rivet, adhesive or other fastening devices maintains the guard cover 430 to the plate 364. The guard cover 430 protects the arcuate recess 404 of the plate 364 from damage due to engagement between the tool head 350 and the wheel brake 318, the knuckle coupler 330 or other objects.

The guard cover 430 may be constructed from an integral one piece unit from metallic material such as steel, stainless steel, aluminum, brass or other rigid materials. The guard cover 430 constructed from brass would be beneficial to reduce sparks generated from contact between the guard cover 430 and the wheel brake 318, the knuckle coupler 330 or other objects. The spark reduction characteristic of the guard cover 430 would be significant if the extension tool 10 was utilized in a flammable environment.

As best shown in FIGS. 1-5, 23 and 34-37, in order to temporarily secure the extension tool 10 to a metallic surface 450, the extension tool 10 may include a magnetic 452 coupled to the extension tool 10. For example, the extension tool 10 may be temporality secured on the inside of a locomotive, on the exterior of the locomotive or on the exterior of the railroad car 300. The magnetic 452 may include a B-42 and/or B-60 neodymium pot magnet. The magnetic 452 may include a slide magnetic 454 or first magnetic 454 coupled to the slide controller 62 or 180. The slide magnetic 454 includes a disc shape 456 defining a field area 458 and an edge area 460. The field area 458 of the slide magnetic 454 is coupled to the slide controller 62 or 180 for providing a field contact area 462 between the field area 458 of the slide magnetic 454 and a metallic surface 450. The slide magnetic 454 temporarily secures the extension tool 10 to the metallic surface 450.

The magnetic 452 may also include a pole magnetic 470 or second magnetic 470 coupled to the first end 26 of the first pole 20 or as illustrated to the fourth pole 290. Similarly, the pole magnetic 470 including a disc shape 472 defining a field area 474 and an edge area 476. The field area 474 of the pole magnetic 470 is coupled to the first end 26 of the first pole 20 or as illustrated to the fourth pole 290 for providing a field contact area 478 between the field area 474 of the pole magnetic 470 and the metallic surface 450 as shown in FIGS. 36 and 37 and/or an edge contact area 480 between the edge area 476 of the pole magnetic 470 and the metallic surface 450 as shown in FIGS. 34 and 35. The pole magnetic 470 temporarily secures the extension tool 10 to the metallic surface 450.

FIGS. 1-5, 23 and 34-37 further illustrate the field contact area 462 of the slide magnetic 454 having a greater contact area than the edge contact area 480 of the pole magnetic 470 for providing an increased magnetic force associated with the field contact area 462 and a decreased magnetic force associated with the edge contact area 480 for temporarily securing the extension tool 10 to the metallic surface 450 and facilitating the removal of the extension tool 10 from the metallic surface 450 by first separating the decreased magnetic force and thereafter the extension tool 10 defining a lever bar 482 to facilitating the separation of the increased magnetic force. The lever bar 482 comprises the slide magnetic is the fulcrum point 484, the first pole 10 is the force leg 486 and the head tool 350 is the pivot leg 488.

FIGS. 1-5, 23 and 34-37 further illustrate the pole magnetic 470 having a magnetic diameter length 490. The first pole 20 has an outside diameter pole length 492. The magnetic diameter length 490 is preferably greater than the outside diameter pole length 492 for defining an end knob 494 in the pole magnetic 470 relative to the first pole 20. The end knob 494 improves grasping of the extension tool 10 by the individual 12.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An extension tool, comprising:
   a first pole defining an interior bore and a first exterior surface with said first pole extending between a first end and a second end;
   a second pole defining a second exterior surface with said second pole extending between a first end and a second end;
   said second pole being partially disposed in said first pole for defining a variable overall tool length;
   a slide controller including a lower clamp and an upper clamp;
   said lower clamp having a primary arm and a secondary arm for defining a first coupler interior bore;
   said upper clamp having a primary arm and a secondary arm for defining a second coupler interior bore;
   said second end of said first pole disposed in said first coupler interior bore of said lower clamp;
   a first clamp compressor extending between said primary arm and said secondary arm of said lower clamp and applying a compressive force between said primary arm and said secondary arm for defining a lower clamp lock and coupling said slide controller with said first pole;
   a second clamp compressor extending between said primary arm and said secondary arm of said upper clamp and applying a compressive force between said primary arm and said secondary arm for defining an upper clamp lock and preventing slidable displacement of said second pole relative to said first pole;
   said second clamp compressor applying a non-compressive force between said primary arm and said secondary arm for said upper clamp defining an upper slide guide;
   said upper slide guide facilitating the slidable displacement of said second pole relative to said first pole;
   a bushing defining an internal bore and an exterior surface;
   said first end of said second pole disposed and coupling to said internal bore of said bushing;
   said exterior surface of said bushing slidably engaging with said interior bore of said first pole for defining a lower slide guide; and
   said lower slide guide and said upper slide guide facilitating the slidable displacement of said second pole relative to said first pole.

2. An extension tool as set forth in claim 1, further including a control knob coupled to said second clamp compressor for improving gripping of said second clamp compressor and increasing the rotational force applied to said second clamp compressor to increase the compressive force between said primary arm and said secondary arm of said upper clamp.

3. An extension tool as set forth in claim 1, wherein
   said first pole and said second pole are formed of a metallic material; and
   said bushing is formed of a polymeric material for creating a metallic to polymeric sliding engagement between said first pole and said second pole.

4. An extension tool as set forth in claim 1, wherein said slide controller includes an interior bore step between said lower clamp and said upper clamp; and said interior bore step defining an extended slide stop upon said bushing contacting said interior bore step for terminating the slidable displacement of said second pole relative to said first pole.

5. An extension tool as set forth in claim 1, further including a third pole defining an interior bore and a third exterior surface with said third pole extending between a first end and a second end;
   said first pole being partially disposed in said third pole for defining a second variable overall tool length;
   a second slide controller including a second lower clamp and an second upper clamp;
   said second lower clamp having a primary arm and a secondary arm for defining an third coupler interior bore;
   said second upper clamp having a primary arm and a secondary arm for defining an fourth coupler interior bore;
   said second end of said third pole disposed in said third coupler interior bore of said second lower clamp;
   a third clamp compressor extending between said primary arm and said secondary arm of said second lower clamp and applying a compressive force between said primary arm and said secondary arm for defining a second lower clamp lock and coupling said second slide controller with said third pole;
   a fourth clamp compressor extending between said primary arm and said secondary arm of said second upper clamp and applying a compressive force between said primary arm and said secondary arm for defining an second upper clamp lock and preventing slidable displacement of said first pole relative to said third pole;
   said fourth clamp compressor applying a non-compressive force between said primary arm and said secondary arm for said second upper clamp defining an second upper slide guide; and
   said second upper slide guide facilitating the slidable displacement of said first pole relative to said third pole.

6. An extension tool as set forth in claim 1, further including a third pole defining an interior bore and a third exterior surface with said third pole extending between a first end and a second end;
   said first pole being partially disposed in said third pole for defining a second variable overall tool length;
   a second slide controller including a second lower clamp and an second upper clamp;
   said second lower clamp having a primary arm and a secondary arm for defining an third coupler interior bore;
   said second upper clamp having a primary arm and a secondary arm for defining an fourth coupler interior bore;
   said second end of said third pole disposed in said third coupler interior bore of said second lower clamp;
   a third clamp compressor extending between said primary arm and said secondary arm of said second lower clamp and applying a compressive force between said primary arm and said secondary arm for defining a second lower clamp lock and coupling said second slide controller with said third pole;
   a fourth clamp compressor extending between said primary arm and said secondary arm of said second upper clamp and applying a compressive force between said primary arm and said secondary arm for defining, an second upper clamp lock and preventing slidable displacement of said first pole relative to said third pole;
   said fourth clamp compressor applying a non-compressive force between said primary arm and said secondary arm for said second upper clamp defining an second upper slide guide;
   said second upper slide guide facilitating the slidable displacement of said first pole relative to said third pole;
   said slide controller including a lower break surface;
   said second slide controller including an upper break surface; and
   said lower break surface and said upper break surface defining a contracted slide stop upon said lower break surface contacting said upper break surface for terminating the slidable displacement of said first pole relative to said third pole.

7. An extension tool as set forth in claim 1, further including
   a third pole defining an interior bore and a third exterior surface with said third pole extending between a first end and a second end;
   a second bushing defining an internal bore and an exterior surface;
   said first end of said first pole disposed and coupling to said internal bore of said second bushing;
   said first pole being partially disposed in said third pole with said exterior surface of said second bushing slidably engaging with said interior bore of said third pole for defining a second lower slide guide;
   a second slide controller including a second lower clamp and an second upper clamp;
   said second lower clamp having a primary arm and a secondary arm for defining an third coupler interior bore;
   said second upper clamp having a primary arm and a secondary arm for defining an fourth coupler interior bore;
   said second end of said third pole disposed in said third coupler interior bore of said second lower clamp;
   a third clamp compressor extending between said primary arm and said secondary arm of said second lower clamp and applying a compressive force between said primary arm and said secondary arm for defining a second lower clamp lock and coupling said second slide controller with said third pole;
   a fourth clamp compressor extending between said primary arm and said secondary arm of said second upper clamp and applying a compressive force between said primary arm and said secondary arm for defining an second upper clamp lock and preventing slidable displacement of said first pole relative to said third pole,
   said fourth clamp compressor applying a non-compressive force between said primary arm and said secondary arm for said second upper clamp defining an second upper slide guide; and
   said second lower slide guide and said second upper slide guide facilitating the slidable displacement of said first pole relative to said third pole.

8. An extension tool as set forth in claim 1, further including a third pole defining an interior bore and a third exterior surface with said third pole extending between a first end and a second end;
   said first pole being partially disposed in said third pole for defining a second variable overall tool length;
   a second slide controller including a second lower clamp and an second upper clamp;
   said second lower clamp having a primary arm and a secondary arm for defining, an third coupler interior bore;
   said second upper clamp having a primary arm and a secondary arm for defining an fourth coupler interior bore;
   said second end of said third pole disposed in said third coupler interior bore of said second lower clamp;
   a third clamp compressor extending between said primary arm and said secondary arm of said second lower clamp and applying a compressive force between said primary arm and said secondary arm for defining a second lower clamp lock and coupling said second slide controller with said third pole;
a fourth clamp compressor extending between said primary arm and said secondary arm of said second upper clamp and applying a compressive force between said primary arm and said secondary arm for defining an second upper clamp lock and preventing slidable displacement of said first pole relative to said third pole;
said fourth clamp compressor applying a non-compressive force between said primary arm and said secondary arm for said second upper clamp defining an second upper slide guide; and
said second upper slide guide facilitating the slidable displacement of said first pole relative to said third pole;
a control knob coupled to said second clamp compressor for improving gripping of said second clamp compressor and increasing the rotational force applied to said second clamp compressor to increase the compressive force between said primary arm and said secondary arm of said upper clamp;
a second control knob coupled to said fourth clamp compressor for improving gripping of said fourth clamp compressor and increasing the rotational force applied to said fourth clamp compressor to increase the compressive force between said primary arm and said secondary arm of said second upper clamp; and
said control knob and said second control knob having a staggered orientation for abutting said slide controller and said second slide controller.

9. An extension tool as set forth in claim 1, further including a magnetic coupled to said extension tool for temporarily securing the extension tool to a metallic surface.

10. An extension tool as set forth in claim 1, further including a slide magnetic coupled to said slide controller;
said slide magnetic including a disc shape defining a field area and an edge area;
said field area of said slide magnetic coupled to said slide controller for providing a field contact area between said field area of said slide magnetic and a metallic surface; and
said slide magnetic temporarily securing the extension tool to the metallic surface.

11. An extension tool as set forth in claim 1, further including a pole magnetic coupled to said first end of said first pole;
said pole magnetic including a disc shape defining a field area and an edge area; and
said field area of said pole magnetic coupled to said first end of said first pole for providing a field contact area between said field area of said pole magnetic and a metallic surface and/or an edge contact area between said edge area of said pole magnetic and the metallic surface; and
said pole magnetic temporarily securing the extension tool to the metallic surface.

12. An extension tool as set forth in claim 1, further including a pole magnetic coupled to said first end of said first pole;
said pole magnetic including a disc shape defining a field area and an edge area;
said field area of said pole magnetic coupled to said first end of said first pole for providing a field contact area between said field area of said pole magnetic and a metallic surface and/or an edge contact area between said edge area of said pole magnetic and the metallic surface;
said pole magnetic having a magnetic diameter length;
said first pole having an outside diameter pole length;
said magnetic diameter length being greater than said outside diameter pole length for said pole magnetic defining an end knob and improving grasping of said extension tool; and
said pole magnetic temporarily securing the extension tool to the metallic surface.

13. An extension tool as set forth in claim 1, further including a first magnetic coupled to said slide controller;
said first magnetic including a disc shape defining a field area and an edge area;
said field area of said first magnetic coupled to said slide controller for providing a field contact area between said field area of said first magnetic and a metallic surface;
a second magnetic coupled to said first end of said first pole,
said second magnetic including a disc shape defining a field area and an edge area;
said field area of said second magnetic coupled to said first end of said first pole for providing a edge contact area between said edge area of said second magnetic and a metallic surface;
said first magnetic and said second magnetic temporarily securing the extension tool to the metallic surface; and
said field contact area having a greater contact area than said edge contact area for providing an increased magnetic force associated with said field contact area and a decreased magnetic force associated with said edge contact area for temporarily securing the extension tool to the metallic surface and facilitating the removal of the extension tool from the metallic surface by first separating said decreased magnetic force and thereafter said increased magnetic force.

14. An extension tool as set forth in claim 1, further including a tool head having a mounting portion and a working portion;
said mounting portion defining a mounting bore and an exterior mounting surface;
said second end of said second pole disposed in said mounting bore of said tool head for coupling said second pole to said tool head;
said working portion including a plate extending from said exterior mounting surface of said mounting portion;
said plate defining a first side, a second side, a top edge, a side edge and a bottom edge;
said top edge engaging an object for transferring a pushing force from said first pole to said object; and
said bottom edge engaging said object for transferring a pulling force from said first pole to said object.

15. An extension tool for engaging a railroad car, the railroad car including a plurality of wheels for rotatably engaging along a rail system, the plurality of wheels supporting a container, a brake engaging the plurality of wheels for terminating rotation of the plurality of wheels, a wheel brake rotatably coupling to the railroad car, a brake linkage coupling the wheel brake with the brake, the brake compressing or expanding relative to the plurality of wheels upon rotating the wheel brake, the extension tool comprising:
a first pole defining an interior bore and a first exterior surface with said first pole extending between a first end and a second end;
a second pole defining a second exterior surface with said second pole extending between a first end and a second end;
a bushing defining an internal bore and an exterior surface;
said first end of said second pole disposed and coupling, to said internal bore of said bushing;

said second pole being partially disposed in said first pole with said exterior surface of said bushing slidably engaging with said interior bore of said first pole for defining a lower slide guide;

a slide controller including a lower clamp and an upper clamp;

said lower clamp having a primary arm and a secondary arm for defining a first coupler interior bore;

said upper clamp having a primary arm and a secondary arm for defining a second coupler interior bore;

said second end of said first pole disposed in said first coupler interior bore of said lower clamp;

a first clamp compressor extending between said primary arm and said secondary arm of said lower clamp and applying a compressive force between said primary arm and said secondary arm for defining a lower clamp lock and coupling said slide controller with said first pole;

a second clamp compressor extending between said primary arm and said secondary arm of said upper clamp and applying a compressive force between said primary arm and said secondary arm for defining an upper clamp lock and preventing slidable displacement of said second pole relative to said first pole;

said second clamp compressor applying a non-compressive force between said primary arm and said secondary arm for said upper clamp defining an upper slide guide;

Said lower slide guide and said upper slide guide facilitating the slidable displacement of said second pole relative to said first pole;

a tool head having a mounting portion and a working portion;

said mounting portion defining a mounting bore and an exterior mounting surface;

said second end of said second pole disposed in said mounting bore of said tool head for coupling said second pole to said tool head;

said working portion including a plate extending from said exterior mounting surface of said mounting portion;

said plate defining a first side, a second side, a top edge, a side edge and a bottom edge;

said top edge engaging the wheel brake of the railroad car for transferring a pushing force from said tool head to the wheel brake and causing a rotation; and said bottom edge engaging the wheel brake of the railroad car for transferring a pulling force from said tool head to the wheel brake and causing a rotation.

\* \* \* \* \*